United States Patent [19]

Collins

[11] Patent Number: 4,558,516

[45] Date of Patent: Dec. 17, 1985

[54] POSITIVE LOCK AND QUICK RELEASE KNIFE AND SHEATH

[75] Inventor: Walter W. Collins, North, S.C.

[73] Assignee: Gerber Legendary Blades, Portland, Oreg.

[21] Appl. No.: 584,625

[22] Filed: Feb. 29, 1984

[51] Int. Cl.⁴ ............................................. B26B 29/02
[52] U.S. Cl. ........................................ 30/151; 224/232
[58] Field of Search .................... 30/143, 151, 164; 206/349; 224/226, 232, 233, 242, 245

[56] References Cited

U.S. PATENT DOCUMENTS

| | | | |
|---|---|---|---|
| 2,391,574 | 12/1945 | Housinger | 30/151 |
| 2,398,764 | 4/1946 | Bailey | 30/151 |
| 2,439,197 | 4/1948 | Wykoff | 30/151 |
| 2,527,710 | 10/1950 | Davidson | 30/151 |
| 2,783,536 | 3/1957 | McQueary | 30/151 |
| 3,337,952 | 8/1967 | Rosen | 30/272 A |

FOREIGN PATENT DOCUMENTS

| | | | |
|---|---|---|---|
| 641436 | 5/1962 | Canada | 224/245 |
| 324361 | 8/1920 | Fed. Rep. of Germany | 224/232 |

Primary Examiner—Douglas D. Watts
Attorney, Agent, or Firm—Clifton Ted Hunt

[57] ABSTRACT

A positive lock and quick release knife and sheath wherein an abutment extends from the sheath and through the knife and a spring normally urges the knife against the abutment to positively prevent movement of the knife relative to the sheath, and the front or outer wall of the sheath being shortened to facilitate quick release of the knife from the sheath when the spring is overcome and the knife is moved away from the abutment.

4 Claims, 8 Drawing Figures

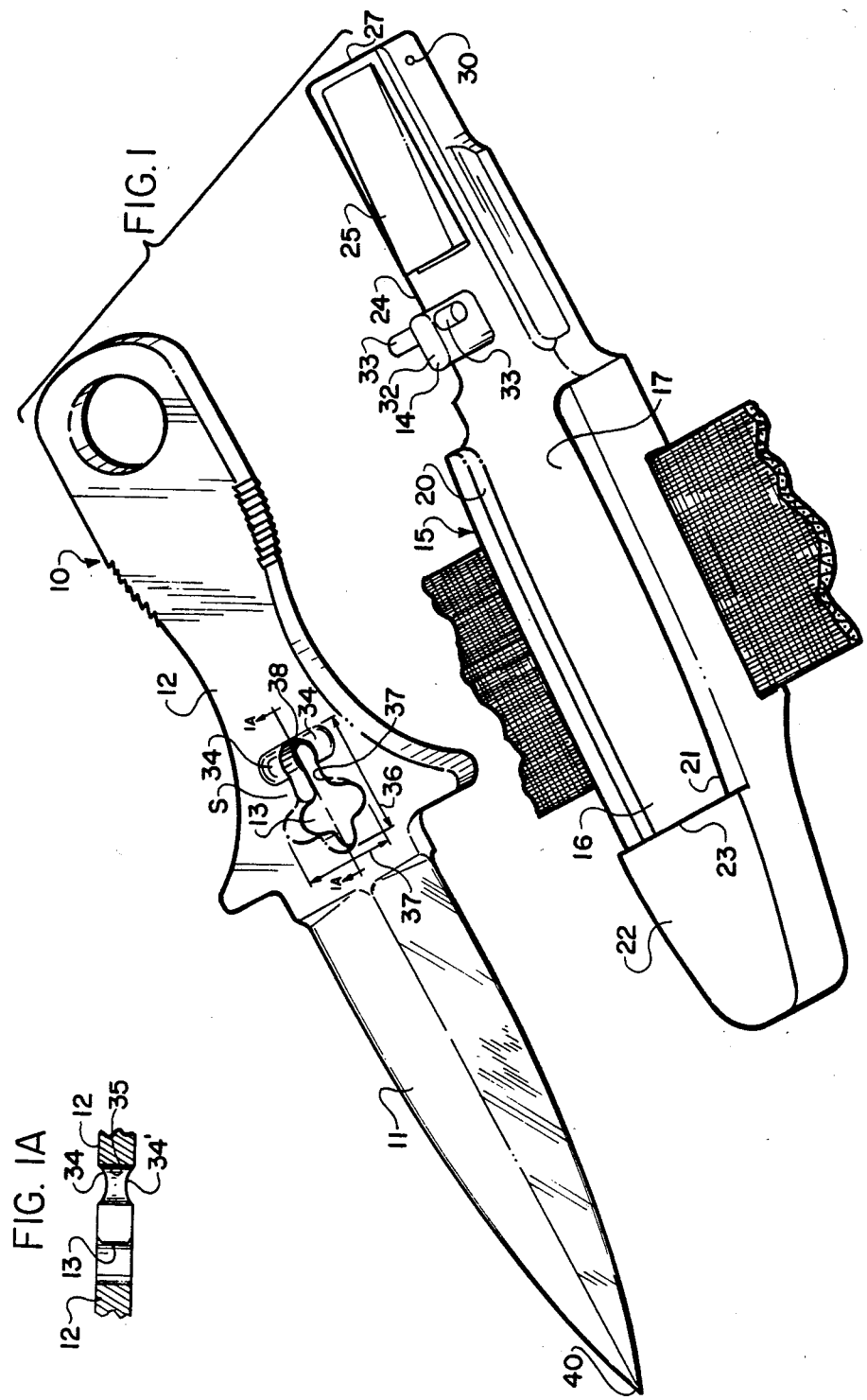

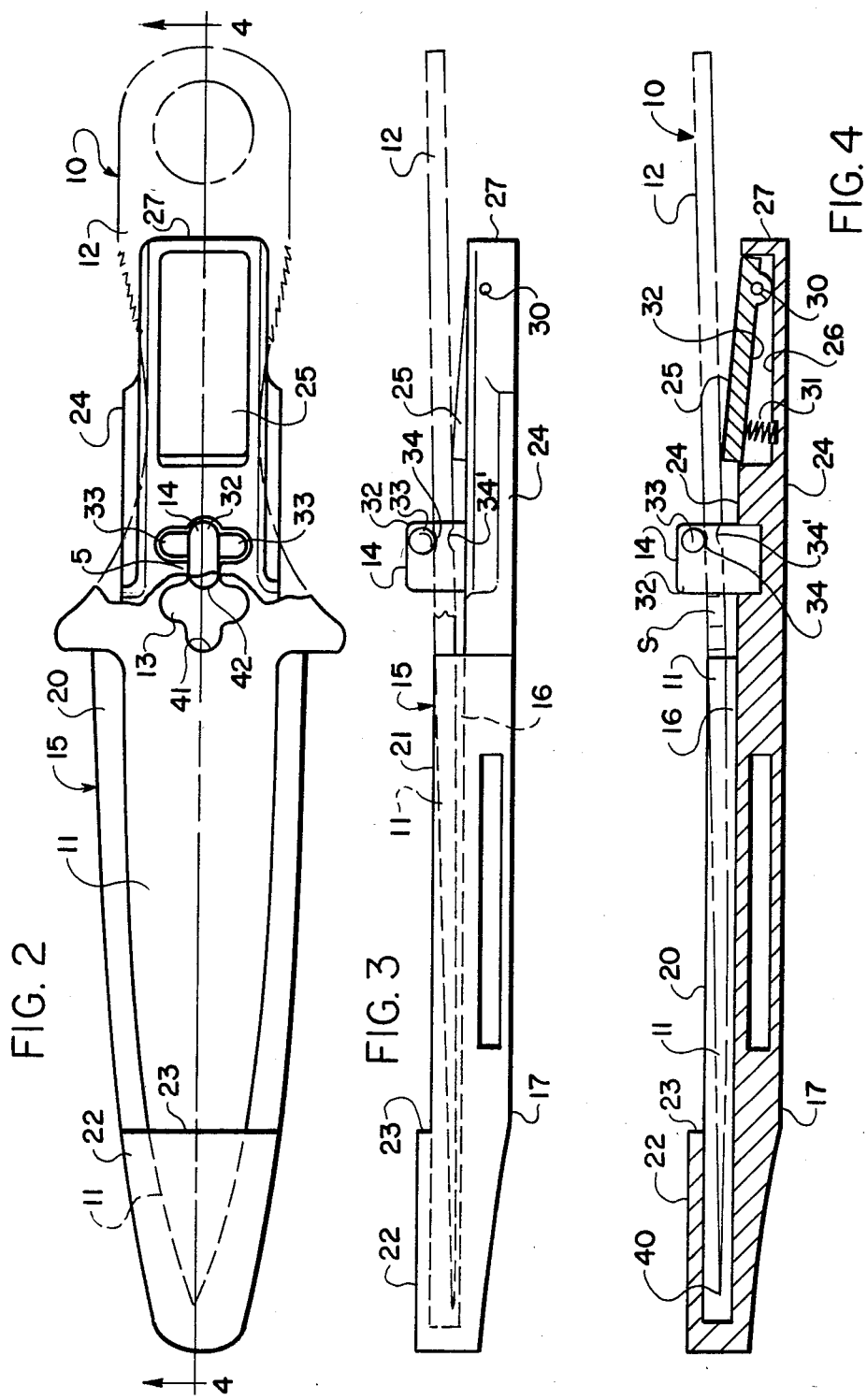

POSITIVE LOCK AND QUICK RELEASE KNIFE AND SHEATH

BACKGROUND OF THE INVENTION

The broad concept of a knife and sheath provided with a mechanism for releasably retaining the knife in the sheath and for quickly releasing the knife from the sheath is known in the art. Specific embodiments of the concept are found in U.S. Pat. No. 2,391,574 issued Dec. 25, 1945 to G. E. Housinger and entitled DEVICE FOR LOCKING HUNTING KNIVES IN THEIR SCABBARDS, U.S. Pat. No. 2,527,710 issued Oct. 31, 1950 to Harold O. Davidson, Jr. and entitled DEVICE FOR LOCKING KNIVES IN THEIR SCABBARDS, U.S. Pat. No. 2,783,536 issued Mar. 5, 1957 to M. F. McQueary and entitled KNIFE AND SHEATH WITH LATCH MEANS, U.S. Pat. No. 2,439,197 issued Apr. 6, 1948 to Garrett J. Wykoff and entitled SHEATHED KNIFE FASTENING, U.S. Pat. No. 2,398,764 issued Apr. 23, 1946 to Donald C. Bailey and entitled SHEATHED KNIFE CLASP.

U.S. Pat. No. 2,783,536 to McQueary discloses a spring pressed latch mechanism wherein the sheath extends upwardly beyond the juncture of the handle and blade of the knife and one side of the sheath has a pin extending outwardly and engageable with a recess in the handle and the other side of the sheath has a metal spring bearing against the handle and urging it toward the retaining pin.

U.S. Pat. No. 2,391,574 to Housinger discloses a rigid scabbard extending completely about the blade of the knife with a portion of the scabbard extending into overlapping relation with a collar extending about the inner end of the handle. A flexible spring arm 10 is fastened to the portion of the blade within the handle, from which it extends outwardly and downwardly terminating in an outwardly projecting pin 13 receivable within a notch 14 in the scabbard.

The disclosures of McQueary and Housinger are typical of the teaching of the prior art known to applicant in the use of spring pressure urging the knife into frictional or locking engagement with its sheath. Such arrangements are objectionable in several respects. They do not positively lock the knife to the sheath in the sense that once the spring pressure is overcome the knife may be easily withdrawn in a single motion axially of its sheath or scabbard. This is desirable in some instances but in other instances it may be dangerously unsafe. Another objection is that the tip of the blade must be moved completely beyond the open end of the sheath in order to remove the knife from the sheaths of the prior art. This can be a time-consuming and awkward maneuver. These objections are overcome by the present invention which also offers other advantages.

SUMMARY OF THE INVENTION

The positive lock quick release knife and sheath of the present invention utilizes a two-stage spring actuated mechanism for locking the knife and sheath together and for releasing the knife from the sheath. According to the prior art as known by applicant and exemplified by McQueary and Housinger, release of the spring pressure releases the knife from retaining or locking engagement with the sheath, permitting the tip end of the blade opposite the handle to be drawn axially beyond the open end of the sheath proximal the handle of the knife.

According to the present invention release of the spring pressure which normally retains the knife in locking engagement with the sheath enables the knife to be drawn axially a short distance within the sheath into engagement with an abutment extending laterally from the sheath to complete the first stage of removing the knife from the sheath. Removal of the knife from the sheath is accomplished during a second stage when the knife is moved laterally of the sheath to override the abutment which then enables the knife to be drawn axially of the sheath until it is removed.

The locking mechanism is structured so that the spring normally urges the knife into locking engagement with the sheath and when the spring pressure is overcome and the knife is moved axially to engage the abutment to complete the first stage of removal, the spring pressure then urges the knife laterally relative to the sheath to assist execution of the second and final stage of removal.

The scabbard or sheath, according to the invention, is of rigid construction, preferably made from a durable plastic, and has the usual back and side walls enclosing the back and sides of a knife, and a shortened front wall covering the tip or free end portion of the blade of the knife but exposing the major portion of the blade. The back wall of the sheath includes an extension reaching beyond the blade in overlapping relation with a portion of the handle of a knife seated in the sheath. The latching mechanism projects from the front surface of the extension of the sheath and is engageable with a correspondingly shaped opening in the handle of the knife. A spring is mounted in the extended back portion of the sheath and normally urges the handle of the knife away from the sheath.

It is an object of the invention to provide a positive lock quick release knife and sheath wherein a rigid sheath has a shortened front wall exposing a majority of one side of the blade of a knife housed in the sheath, said sheath having a rear wall covering the other side of the blade of a knife seated within the sheath and including an extension overlying at least a portion of the handle of the knife, an abutment extending laterally from the extended back wall of the sheath and limiting direct axial movement of the knife relative to the sheath, a correspondingly shaped opening in the handle of the knife registrable with the abutment, and spring means normally urging the handle of the knife away from the sheath.

It is another object of the invention to provide a knife and sheath wherein the sheath encloses one side and both edges of the blade with a major portion of the opposite side of the blade being exposed, spring means normally urging the knife laterally outwardly of the sheath, and retaining means preventing direct axial removal of the knife from the sheath.

BRIEF DESCRIPTION OF THE DRAWINGS

FIG. 1 is an exploded perspective view illustrating the knife, the sheath and a strap or belt for attaching the sheath and knife to a user;

FIG. 1A is a sectional view taken substantially along the line 1A—1A in FIG. 1;

FIG. 2 is a front view of the knife within the sheath and showing the handle of the knife in phantom lines to more clearly illustrate the structure of the extended portion of the sheath beneath the handle;

FIG. 3 is a side elevation of the knife and sheath shown in FIG. 2;

FIG. 4 is a sectional view taken substantially along the line 4—4 in FIG. 2;

DETAILED DESCRIPTION OF THE INVENTION

Figure 5:
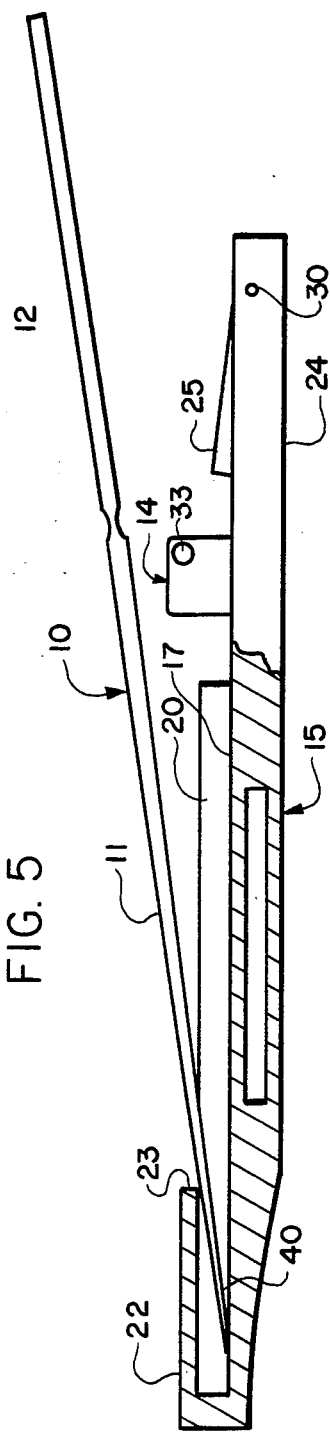
FIG. 5 is a side elevation of the knife and sheath similar to FIG. 3, but illustrating the knife positioned beyond the abutment and in position to complete the second stage of removal.

Referring more specifically to the drawings, the numeral 10 broadly indicates a knife having a blade 11 and a handle 12. The handle 12 has an opening 13 extending therethrough and registrable with an abutment 14 projecting laterally from a sheath broadly indicated at 15.

The sheath 15 is of rigid construction and is preferably made from a durable plastic such as nylon. The sheath has a pocket 16 defined by a rear wall 17, side walls 20 and 21 and an abbreviated front wall 22 extending between the end portions of the side walls 20 and 21 remote from the abutment 14. The top of the pocket 16 is open beyond the inner edge 23 of the front wall 22 and the end of the pocket 16 remote from the front wall 22 communicates with an extended portion 24 of the back wall 17. A pivoted lever 25 is positioned in a cavity 26 (FIG. 4) in the extension 24 near the top end 27 of the sheath 15. A pivot pin 30 extends through the end of the lever 25 adjacent the end wall 26 and the ends of the pin 30 are journaled in the extended portion 24 of sheath 15. A coil spring 31 is positioned in the cavity 26 and the spring 31 extends between the floor of the cavity 26 and the inner surface 32 of the lever 25. The spring 30 normally urges the lever 25 outwardly beyond the plane of the extended portion 24 of sheath 15 (FIG. 4).

The abutment 14 extends from the sheath extension 24 between the lever 25 and the pocket 16, and the abutment 14 as shown in FIGS. 1 through 5 is of a T-shaped configuration including a body portion 32 extending along the longitudinal axis of the sheath 15 and a cross-bar 33 projecting perpendicularly from opposite sides of the body portion 32.

The spring pressed lever 32 and the abutment 14 with its longitudinally extending body portion 32 and the laterally extending cross-bar 33 are part of a latching mechanism for selectively retaining and releasing the knife 10 from the sheath 15. The remainder of the latching mechanism comprises the opening 13 through the handle 12 of the knife and a transverse recess or cavity 34 formed in one surface of the handle 12 and communicating with the reduced end portion 35 of the opening 13. A correspondingly shaped recess of cavity 34¹ is provided in the opposite surface of the handle 12 as most clearly seen in FIG. 1A. The opening 13 is correspondingly shaped to the abutment 14 and has a longitudinal dimension 36 along the longitudinal axis of the knife 10 equal to twice the longitudinal dimension of the body portion 32 of the abutment 14. The opening 13 has a transverse or lateral dimension 37 at least equal to the length of the cross-bar 33 projecting from both sides of the body portion 32. A reduced end portion 38 of the opening 13 extends between and communicates with the cavities 34, 34¹ as at 39 and the transverse area of the opening 13 indicated by the transverse dimension line 37.

In operation, the knife 10 is placed in the sheath 15 by placing the blade 11 in the pocket 16 and sliding the tip end 40 of the blade 11 under the front wall 22 until the opening 13 registers with the abutment 14. The handle 12 is then pressed toward the extension 24 of the sheath 15 to overcome the spring 31 and enable the surface S of the handle between the opening 13 and the recess 34 to pass beneath the cross-bar 33 as the tip 40 of the blade 11 is moved further into the pocket 16 beneath the front wall 22 until the recess 34 registers with the cross-bar 33 and the end 38 of the opening 13 engages the body portion 32 of the abutment 14. The spring 31 then moves the handle 12 outwardly with the recess or cavity 34 partially encircling the cross-bar 33 to lock the knife and sheath together.

When it is desired to remove the knife from the sheath, the handle 12 is pressed toward the sheath extension 24 to overcome the spring 31 and permit the surface portion S of handle 12 to pass beneath the cross-bar 33 bringing the major transverse portion 37 of opening 13 into registry with the cross-bar 33. When the major transverse portion 37 of opening 13 registers with the cross-bar 33, the inner end wall 41 of opening 13 engages the inner end 42 of abutment 14, preventing further movement of the knife 10 axially of the sheath 15. This completes the first stage of removing the knife from the sheath.

At the same time the wall 41 engages inner end 42 of abutment 14, the spring pressed lever 25 urges the handle 12 away from the sheath extension 24 and facilitates further manual movement of the handle 12 laterally of the extension 24 until the handle 12 is moved beyond abutment 14, bringing the blade 11 away from the rear wall 17 and above the side walls 20, 21 to the position shown in FIG. 5 with the tip 40 of the blade close to the inner end 23 of top wall 22. The knife 10 may then be readily removed from the sheath 15 by moving the knife laterally from the sheath instead of having to pull it axially of the sheath until the blade tip 40 clears the end portion of the sheath adjacent the handle as in the prior art.

Figure 6:
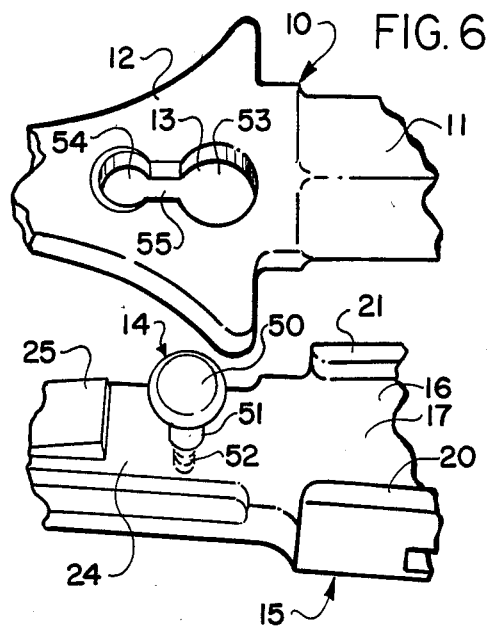
FIG. 6 is a fragmentary exploded perspective view of a knife and sheath similar to FIG. 1 and illustrating a modified form of the locking mechanism.
Figure 7:
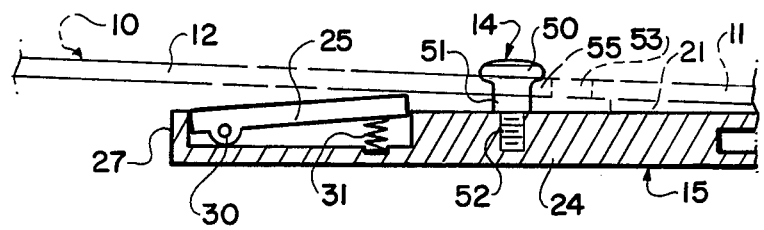
FIG. 7 is a fragmentary sectional view similar to FIG. 4 but illustrating the locking mechanism of FIG. 6.

A modified form of the invention is illustrated in FIGS. 6 and 7 wherein like parts are marked with the same reference characters as used in describing the first form of the invention. The only difference is the configuration of the abutment 14 and the correspondingly shaped opening 13. In the embodiment of FIGS. 6 and 7, the abutment 14 is in the cylindrical form of a mushroom with a head 50, a reduced stem 51, and a further reduced threaded anchor portion 52 threadably engaged with the sheath extension 24. The opening 13 has a circular portion 53 large enough to receive the head 50 and a smaller circular portion 54 large enough to receive the stem 51. Communication is established between the circular portions 50, 51 by a reduced neck portion 55.

In practice, the opening 53 is brought into registry with the head 50 preparatory to inserting the knife 10 in the sheath 15 and moved to the position of FIG. 7 with the reduced circular portion 54 encircling the stem 51 of abutment 14. The spring pressed lever 25 urges the knife handle 12 into engagement with the lower portion of head 50 to retain the knife in the sheath. The knife in FIGS. 6 and 7 is removed from the sheath the same way as previously described for the removal of the knife of FIGS. 1-5.

Although specific terms have been used in describing the invention, they are used in a descriptive sense only and not for purposes of limitation.

I claim:

1. A knife and sheath including means for positively locking and quickly releasing the knife from the sheath wherein the knife has a blade and a handle and the sheath includes a front wall, side walls, a rear wall and an extension of the rear wall extending beyond the side walls of the sheath, said means comprising an abutment projecting laterally from the extension of the rear wall, a cross-bar projecting transversely from the abutment in spaced parallel relation to said extension of the rear wall, the handle of the knife having a first opening extending therethrough and shaped and dimensioned to freely receive the abutment and cross-bar with the cross-bar extending laterally outwardly beyond the knife and in juxtaposition with the knife when the knife is seated in the sheath, means for moving a portion of the knife adjacent the first opening beneath said cross-bar, and means urging the handle of the knife away from the extension of the rear wall and into engagement with the said cross-bar to maintain the abutment on the sheath in the opening extending through the handle of the knife and thereby retain the knife in the sheath.

2. A structure according to claim 1 wherein the means for moving a portion of the knife adjacent the said first opening beneath the cross-bar comprises the handle having a second opening therethrough communicating with the said first opening, and the second opening being of less dimension transversely of the handle than the corresponding dimension of the cross-bar.

3. A structure according to claim 1 wherein the means urging the handle of the knife away from the extension of the rear wall comprises a cavity in the said extension, a lever pivotally journaled in said cavity, a spring in said cavity extending between the lever and the said extension normally urging the lever outwardly from the said extension, and said lever engaging the handle of the knife when the knife is seated in the sheath.

4. A positive lock mechanism for retaining the blade of a knife in a rigid sheath having an extension juxtaposed to a portion of the handle when the knife is seated in the sheath, said positive lock mechanism comprising an abutment extending laterally from the surface of the sheath extension proximal to the handle, an opening through the handle, the abutment extending through the opening and outwardly beyond the handle, said abutment including a transverse portion fixed in spaced parallel relation to the handle and extending across a part of the handle when the knife is fully seated in the sheath, means urging the handle into engagement with the abutment to limit movement of the knife relative to the sheath, said part of the handle engageable with the said transverse part of the abutment having a recess corresponding to the shape of said transverse portion of the abutment for seating engagement therewith, and the opposite surface of the handle having a second recess corresponding to said first recess.

* * * * *